United States Patent
Oda

(10) Patent No.: US 11,367,174 B2
(45) Date of Patent: Jun. 21, 2022

(54) TRANSFER SYSTEM FOR TRANSFERRING IMAGING AND DETECTION DATA

(71) Applicant: FANUC CORPORATION, Yamanashi (JP)

(72) Inventor: Masaru Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/909,143

(22) Filed: Jun. 23, 2020

(65) Prior Publication Data

US 2021/0035283 A1 Feb. 4, 2021

(30) Foreign Application Priority Data

Jul. 31, 2019 (JP) .............................. JP2019-140981

(51) Int. Cl.
*G06T 7/00* (2017.01)
*G06V 10/56* (2022.01)
*G06V 20/10* (2022.01)

(52) U.S. Cl.
CPC ............ *G06T 7/0008* (2013.01); *G06V 10/56* (2022.01); *G06V 20/10* (2022.01)

(58) Field of Classification Search
CPC ... G06T 7/0008; G06T 1/0007; G06K 9/4652; G06K 9/00664; G06K 2209/19; G06K 9/6202; G06V 10/56; G06V 20/10; G06V 2201/06; G06V 10/751; G01N 21/01; G01N 21/84; G01N 2021/0112

USPC ........................................................ 382/103
See application file for complete search history.

(56) References Cited

U.S. PATENT DOCUMENTS

2019/0073557 A1 * 3/2019 Matsuda .............. G06Q 10/087

FOREIGN PATENT DOCUMENTS

| CN | 110225238 A | * | 9/2019 | ............. G06T 19/20 |
| JP | 2016-146143 | | 8/2016 | |

* cited by examiner

*Primary Examiner* — Amandeep Saini
(74) *Attorney, Agent, or Firm* — Wenderoth, Lind & Ponack, L.L.P.

(57) ABSTRACT

A transfer system includes a first imaging and detection system that detects an object by using a captured first image, an industrial machine that operates by using information detected by the first imaging and detection system, a second imaging and detection system disposed upstream of the first imaging and detection system to detect an object by using a captured second image, and an operation terminal that outputs, to the second imaging and detection system, an instruction instructing that detection be performed, and to change imaging and detection system data used in the second imaging and detection system. The first imaging and detection system includes a receiving unit to receive the imaging and detection system data from the second imaging and detection system. The second imaging and detection system includes a transmitting unit to transmit the imaging and detection system data to the first imaging and detection system.

5 Claims, 4 Drawing Sheets

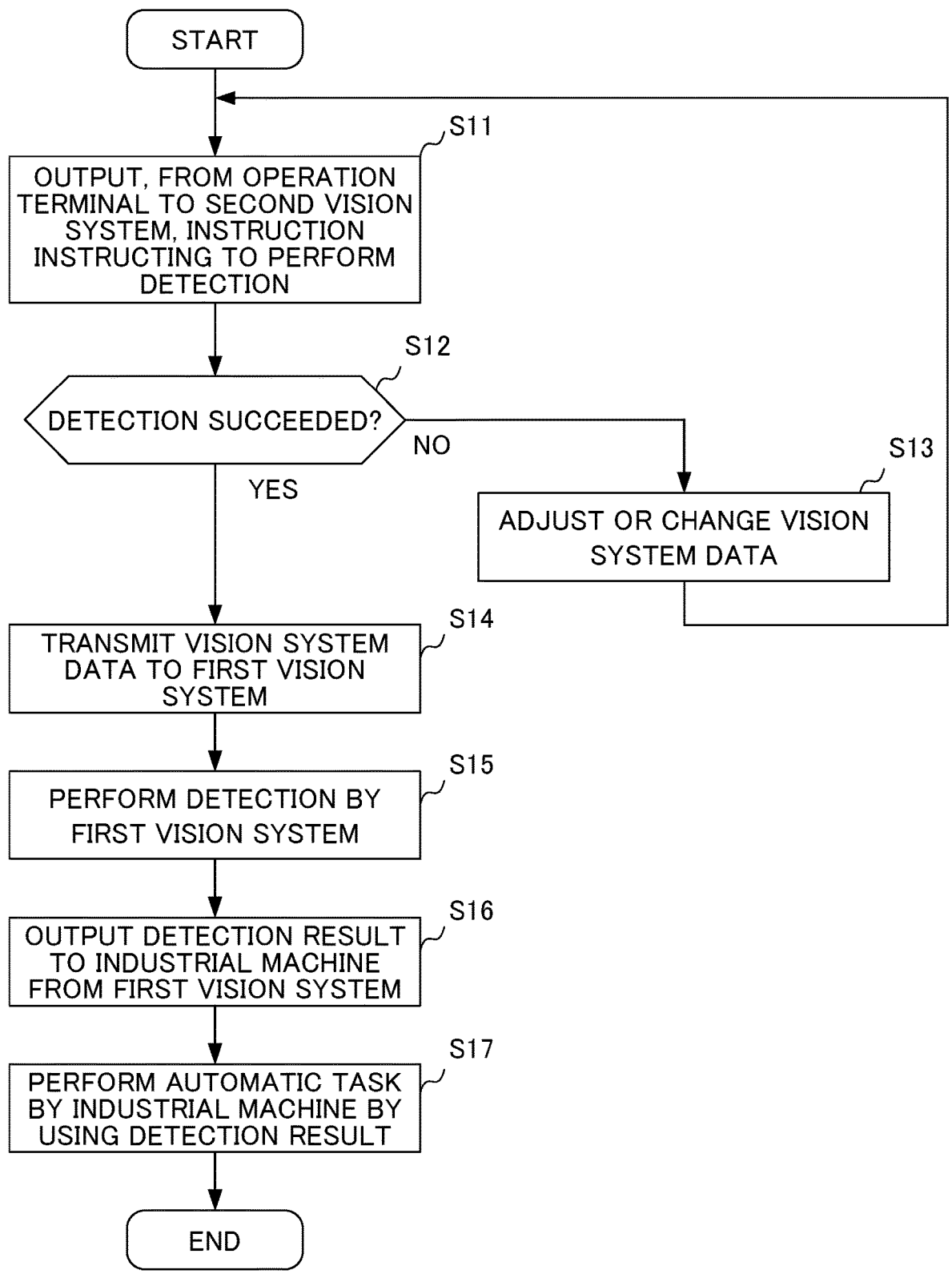

TRANSFER SYSTEM FOR TRANSFERRING IMAGING AND DETECTION DATA

This application is based on and claims the benefit of priority from Japanese Patent Application No. 2019-140981, filed on 31 Jul. 2019, the content of which is incorporated herein by reference.

BACKGROUND OF THE INVENTION

Field of the Invention

The present invention relates to a transfer system for transferring imaging and detection data.

Related Art

In related art, the use of a vision system (to be also referred to as "imaging and detection system" hereinafter) for object detection can sometimes result in missed or false detection due to changes or variations in a workpiece being detected. This is addressed by readjusting the components of the vision system, such as vision system data including the lighting used in the vision system, a vision program (to be also referred to as "imaging and detection program" hereinafter), and a vision parameter (to be also referred to as "imaging and detection parameter" hereinafter).

In this regard, a technique described below is known. The technique includes, in response to an externally provided control signal, performing main imaging by use of a preset main imaging parameter, performing main image processing on image data obtained by the main imaging, performing, during the main image processing, sub-imaging by use of at least one sub-imaging parameter different from the main imaging parameter, performing sub-image processing on the image data obtained by the sub-imaging to thereby extract a sub-image processing result, and if the extracted sub-image processing result is appropriate, making an adjustment such that the sub-imaging parameter that has yielded the processing result is used as a main imaging parameter (see, for example, Japanese Unexamined Patent Application Publication No. 2016-146143).

Patent Document 1: Japanese Unexamined Patent Application, Publication No. 2016-146143

SUMMARY OF THE INVENTION

A problem with the above-mentioned technique is that during readjustment of the vision system, the system is stopped, which can lead to decreased productivity.

Therefore, a need exists for a vision system with which, if a workpiece detection failure occurs at a given location in the vision system, the system is not stopped even during adjustment of the settings for correct detection, thus improving productivity in comparison with existing vision systems.

According to an aspect of the present disclosure, there is provided a transfer system for transferring imaging and detection data, the transfer system including a first imaging and detection system configured to capture a first image, and to detect an object by use of the first image, an industrial machine configured to operate by use of information detected by the first imaging and detection system, a second imaging and detection system disposed upstream of the first imaging and detection system, the second imaging and detection system being configured to capture a second image, and to detect an object by use of the second image, and an operation terminal configured to output an instruction to the second imaging and detection system, and to change imaging and detection system data, the instruction instructing the second imaging and detection system to perform detection, the imaging and detection system data being used in the second imaging and detection system. The first imaging and detection system includes a receiving unit configured to receive the imaging and detection system data from the second imaging and detection system. The second imaging and detection system includes a transmitting unit configured to transmit the imaging and detection system data to the first imaging and detection system.

According to an aspect of the present invention, if a workpiece detection failure occurs at a given location in the vision system, the system is not stopped even during adjustment of the settings for correct detection, thus improving productivity in comparison with conventional vision systems.

BRIEF DESCRIPTION OF THE DRAWINGS

FIG. 3 is a flowchart illustrating operation of a transfer system according to an embodiment.

DETAILED DESCRIPTION OF THE INVENTION

1. First Embodiment

A first embodiment of the present invention will be described below with reference to FIGS. 1 to 3.

[1.1. Overview]

Figure 1:
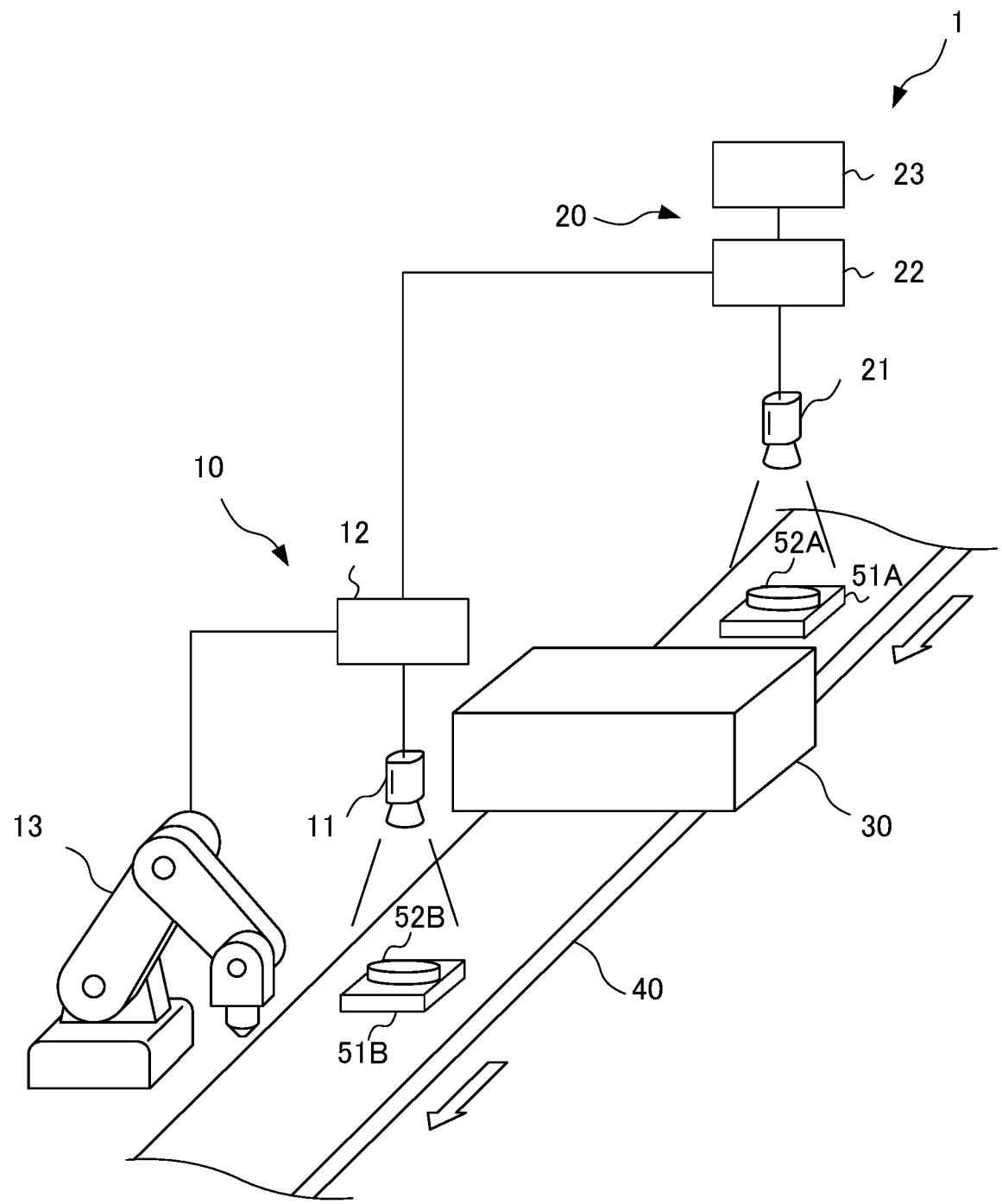
FIG. 1 schematically illustrates a transfer system according to an embodiment.

FIG. 1 schematically illustrates a transfer system for transferring vision data according to the first embodiment of the present invention.

A transfer system 1 includes a first vision system (to be also referred to as "first imaging and detection system" hereinafter) 10, a robot 13, a second vision system 20, and an operation terminal 23. Further, the first vision system 10 includes a detection camera 11, and a control unit 12. The second vision system (to be also referred to as "second imaging and detection system" hereinafter) 20 includes a detection camera 21, and a control unit 22.

For example, the transfer system 1 transfers vision data of a workpiece 52 placed on a tray 51, which is conveyed on a belt conveyor 40 so as to pass through a processing machine 30.

More specifically, in the second vision system 20, the detection camera 21 captures, at a location upstream of the processing machine 30, an image of a workpiece 52A placed on a tray 51A. The control unit 22 detects the workpiece 52A by use of the image captured by the detection camera 21. If missed or false detection occurs at this time, the operator operates the operation terminal 23 to adjust or change vision system data. The operation terminal 23 thus includes a button for instructing that detection be performed, or an interface for adjusting or changing vision system data.

As used herein, the term "detection camera 21" refers to an imaging device for capturing an image of the workpiece 52A. The detection camera 21 may include a zooming function or a direction-changing function.

The term "vision system data" is herein meant to include the above-mentioned captured image, a vision program, a vision parameter, the intensity of lighting used in the second vision system 20, and the color of the lighting.

Further, the term "vision program" refers to a program used in the first vision system 10 and the second vision system 20 to detect the workpiece 52 by use of a captured image of the workpiece 52. Such a vision program may include, for example, a module that gives an instruction to find the workpiece 52.

The term "vision parameter" refers to a parameter used in a vision program. Specifically, the term "vision parameter" may refer to, for example, a threshold used in a vision program, or a parameter for narrowing down the area to be imaged.

Further, the control unit 22 of the second vision system 20 associates the following pieces of data with the workpiece 52A: vision system data used when detection is performed correctly; and adjusted or changed vision system data representing vision system data adjusted or changed in the event of missed or false detection. The control unit 22 then transmits the resulting data to the first vision system 10. Each individual piece of such vision system data is associated with each workpiece 52A.

In the first vision system 10, the detection camera 11 captures an image of a workpiece 52B that is placed on a tray 51B and has been processed by the processing machine 30. The control unit 12 detects the workpiece 52B by use of the image captured by the detection camera 11. At this time, the control unit 12 uses the adjusted or changed vision system data received from the second vision system 20. This significantly increases the probability of correct detection of the workpiece 52B.

The vision system data used in the first vision system 10 includes, in addition to the adjusted or changed vision system data received from the second vision system 20, an image captured by the detection camera 11, the intensity of lighting used in the first vision system 10, and the color of the lighting.

Further, the control unit 12 outputs the correct detection result of the workpiece 52B to the robot 13. The robot 13 is thus able to execute an automatic task by use of the correct workpiece detection result.

Although not illustrated in FIG. 1, a storage buffer may be provided between the control unit 12 of the first vision system 10, and the control unit 22 of the second vision system 20 to store adjusted or changed vision system data into the storage buffer. As a result, after detection is performed correctly, the vision system data used for the correct detection is fed forward for storage into the storage buffer.

Rather than associating adjusted or changed vision system data with the workpiece 52A, the control unit 22 of the second vision system 20 may transmit, to the first vision system 10, information about the order of each piece of vision system data and the order of each workpiece 52A, and in the first vision system 10, each piece of vision system data and each workpiece 52B that are equal in their order may be associated with each other.

In this case, a tag or QR code (registered trademark) used for making such an association does not need to be affixed to the workpiece 52A and the workpiece 52B.

[1.2. General Arrangement]

Figure 2:
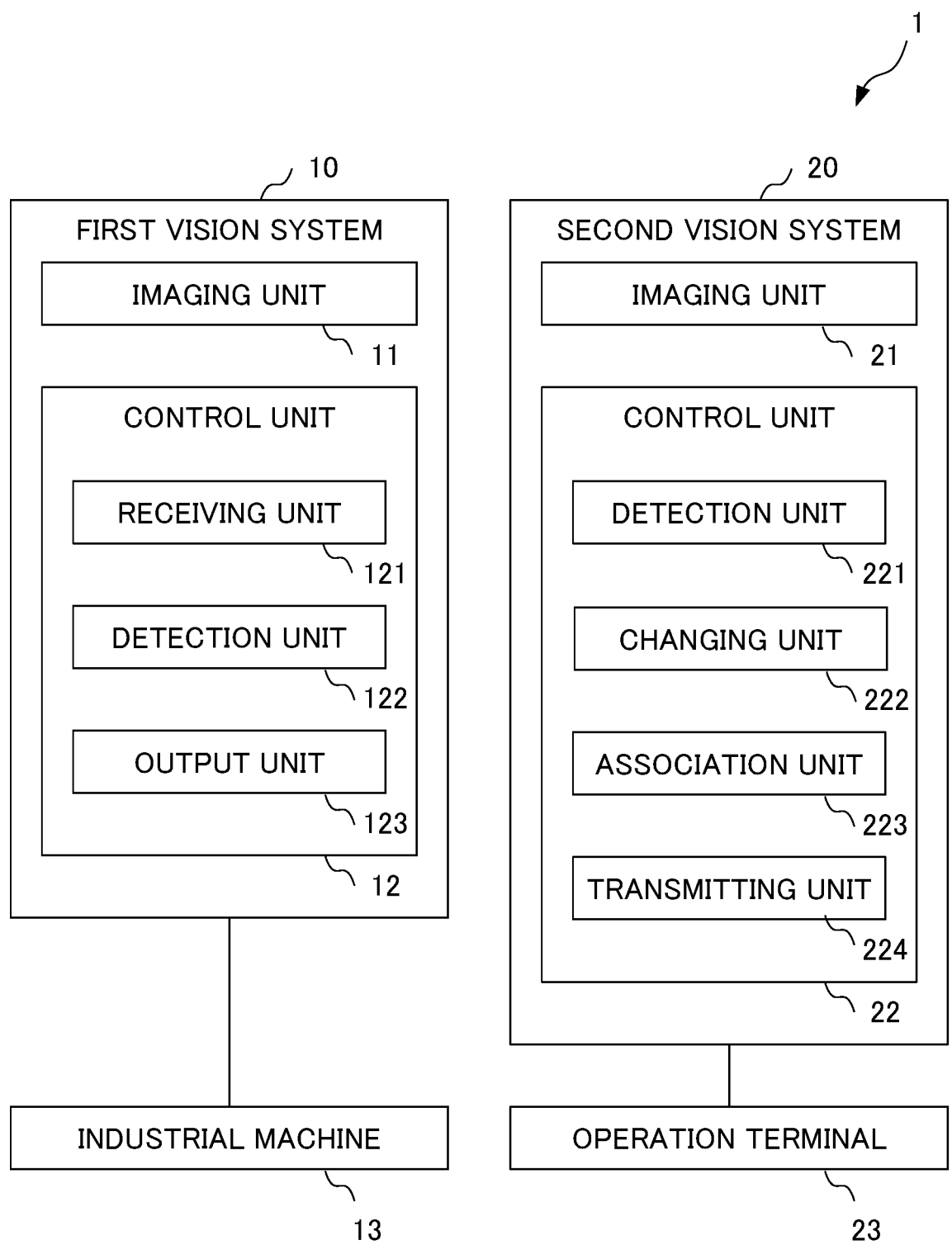
FIG. 2 is a functional block diagram of a transfer system according to an embodiment.

FIG. 2 is a functional block diagram of the transfer system 1.

The transfer system 1 includes the first vision system 10, an industrial machine 13, the second vision system 20, and the operation terminal 23.

The first vision system 10 includes an imaging unit 11, and the control unit 12.

The imaging unit 11 captures an image of the workpiece 52B, which is an object to be detected by the first vision system 10. The imaging unit 11 corresponds to the detection camera 11 illustrated in FIG. 1.

The control unit 12 controls the overall operation of the first vision system 10. The control unit 12 reads various programs from a storage area such as a ROM, a RAM, a flash memory, or a hard disk drive (HDD) as appropriate and executes the programs to implement various functions according to the first embodiment. The control unit 12 may be a CPU. The control unit 12 includes a receiving unit 121, a detection unit 122, and an output unit 123.

The receiving unit 121 receives adjusted or changed vision system data from the second vision system 20.

The detection unit 122 detects the workpiece 52B by use of an image of the workpiece 52B captured by the imaging unit 11. At this time, the detection unit 122 uses adjusted or changed vision system data received by the receiving unit 121 from the second vision system 20. This significantly increases the probability of correct detection of the workpiece 52B.

The output unit 123 outputs the detection result of the workpiece 52B detected by the detection unit 122 to the industrial machine 13.

The industrial machine 13 executes an automatic task by use of the detection result of the workpiece 52B input from the first vision system 10. The industrial machine 13 corresponds to the robot 13 illustrated in FIG. 1.

The second vision system 20 includes an imaging unit 21, and the control unit 22.

The imaging unit 21 captures an image of the workpiece 52A, which is an object to be detected by the second vision system 20. The imaging unit 21 corresponds to the detection camera 21 illustrated in FIG. 1.

The control unit 22 controls the overall operation of the second vision system 20. The control unit 22 reads various programs from a storage area such as a ROM, a RAM, a flash memory, or a hard disk drive (HDD) as appropriate and executes the programs to implement various functions according to the first embodiment. The control unit 22 may be a CPU. The control unit 22 includes a detection unit 221, a changing unit 222, an association unit 223, and a transmitting unit 224.

The detection unit 221 detects the workpiece 52A by use of an image of the workpiece 52A captured by the imaging unit 21.

The changing unit 222 adjusts or changes vision system data through an operation made from the operation terminal 23 described later, if missed or false detection occurs during detection of the workpiece 52A by the detection unit 221.

The association unit 223 associates the following pieces of data with the workpiece 52A: vision system data used when detection is performed correctly; and adjusted or changed vision system data representing vision system data adjusted or changed in the event of missed or false detection.

The transmitting unit 224 transmits, to the first vision system 10, the vision system data for which an association has been established by the association unit 223.

The operation terminal 23 is a device used for instructing the second vision system 20 to detect the workpiece 52A, and for adjusting or changing vision system data.

[1.3. Operation]

FIG. 3 is a flowchart illustrating operation of the transfer system 1.

At step S11, the operation terminal 23 outputs, to the second vision system 20, an instruction instructing the second vision system 20 to detect the workpiece 52A.

At step S12, if the detection succeeds (S12: YES), the process proceeds to step S14. If the detection fails, that is, if missed or false detection occurs (S12: NO), the process proceeds to step S13.

At step S13, the second vision system 20 adjusts or changes vision system data. Then, the process proceeds to step S11.

At step S14, the second vision system 20 transmits the vision system data to the first vision system 10.

At step S15, the first vision system 10 detects the workpiece 52B.

At step S16, the first vision system 10 outputs the detection result of the workpiece 52B to the industrial machine 13.

At step S17, the industrial machine 13 performs an automatic task by use of the detection result of the workpiece 52B.

[1.4. Advantageous Effects of First Embodiment]

The transfer system 1 according to the first embodiment makes it possible to check in advance whether workpiece detection is possible. In the event of a detection failure such as missed or false detection of a workpiece, a vision program, a vision parameter, lighting, or other settings can be adjusted on the spot to enable correct detection.

Further, by transferring the adjustment results obtained in the workpiece introduction process to the robot process, the probability of correct detection by the vision system significantly improves. This makes it possible to achieve improved productivity in comparison with conventional vision systems.

2. Second Embodiment

A second embodiment of the present invention will be described below with reference to FIGS. 4A to 4C.

[2.1. Overview]

In the first embodiment, a workpiece is detected in advance in an upstream process before the workpiece is detected in a downstream process, and if missed or false detection occurs, vision system data is adjusted or changed, and the resulting vision system data is then transmitted to the downstream process. In the downstream process, the vision system data received from the upstream process is used in detecting the workpiece, thus increasing the probability of correct detection by the vision system.

In a second embodiment, the second vision system 20 detects an image of only a tray with no workpiece placed thereon, and the first vision system 10 subtracts the image of only the tray from an image of the tray with a workpiece placed thereon, thus increasing the probability of correct detection by the first vision system 10.

Figure 4A:
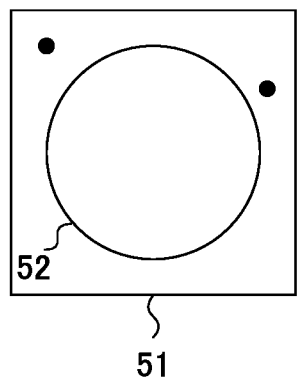
FIGS. 4A to 4C conceptually illustrate a transfer system according to an embodiment.
Figure 4B:
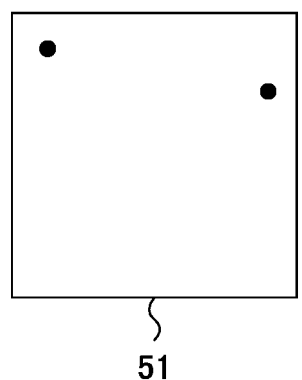
Figure 4C:
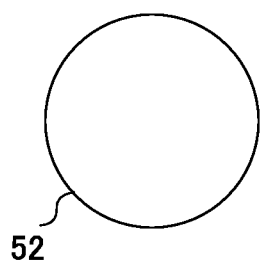

FIGS. 4A to 4C conceptually illustrate a transfer system 1A according to the second embodiment. The functional blocks of the transfer system 1A according to the second embodiment are the same as the functional blocks of the transfer system 1 according to the first embodiment illustrated in FIG. 2, and thus will not be described in further detail.

If, as illustrated in FIG. 4A, the workpiece 52 is placed on the tray 51, and there is dirt on the tray 51, the probability of correct detection of the workpiece 52 decreases. Accordingly, in the second vision system 20, an image of only the tray 51 illustrated in FIG. 4B is captured.

Subsequently, in the first vision system 10, the image of the tray 51 illustrated in FIG. 4B is subtracted from an image of the tray 51 and the workpiece 52 illustrated in FIG. 4A to thereby obtain an image of the workpiece 52 illustrated in FIG. 4C.

The above-mentioned configuration increases the probability of correct detection of the workpiece 52 even if there is dirt on the tray 51.

[2.2. Advantageous Effects of Second Embodiment]

With the transfer system 1A according to the second embodiment, even if there is dirt on the tray, an image of only a tray is obtained in advance, thus making it possible to adjust the settings for correct detection.

3. Modifications

In the foregoing description of the first and second embodiments, the receiving unit 121 of the first vision system 10, and the transmitting unit 224 of the second vision system 20 are separate from each other. However, this is not intended to be limiting. For example, the receiving unit 121 and the transmitting unit 224 may be contained in the same housing.

Further, if the transfer system 1 or 1A includes a storage buffer as described above, the storage buffer may be also contained in the same housing, in addition to the receiving unit 121 and the transmitting unit 224.

Although embodiments of the present invention have been described above, the present invention is not limited to the embodiments above. Further, the advantageous effects described with reference to the embodiments above are considered to be merely illustrative of the most favorable effects resulting from the present invention, and the advantageous effects of the present invention are not limited to those described with reference to the embodiments above.

A control method using the transfer system 1 or 1A is implemented by software. If the control method is to be implemented by software, programs constituting the software are installed onto a computer (transfer system 1 or 1A). These programs may be stored in a removable medium for distribution to a user, or may be downloaded via a network onto a user's computer for distribution to the user. Further, rather than being downloaded, these programs may be provided to a user's computer (transfer system 1 or 1A) as a Web service via a network.

EXPLANATION OF REFERENCE NUMERALS 1, 1A transfer system
10 first vision system
11, 21 imaging unit (detection camera)
12, 22 control unit
13 industrial machine (robot)
20 second vision system
23 operation terminal
121 receiving unit
122, 221 detection unit
123 output unit
222 changing unit
223 association unit
224 transmitting unit

What is claimed is:

1. A transfer system for transferring imaging and detection data, the transfer system comprising:
a first processor for a first imaging and detection system configured to detect an object processed by a processing machine using a first image captured;

an industrial machine configured to operate by use of information detected by the first imaging and detection system;

a second processor for a second imaging and detection system disposed upstream of the first imaging and detection system across the processing machine and configured to detect an object before being processed by the processing machine, using a second image captured; and an operation terminal having an interface configured to output an instruction to the second imaging and detection system, and to change imaging and detection system data, the instruction instructing the second imaging and detection system to perform detection, the imaging and detection system data being used in the second imaging and detection system, wherein the first processor functions to receive the imaging and detection system data from the second imaging and detection system, and wherein the second processor functions to transmit the imaging and detection system data, which is used so that the object can be detected by the second imaging and detection system, to the first imaging and detection system which uses the transmitted imaging and detection system data in also detecting the object.

2. The transfer system according to claim 1,
wherein the imaging and detection system data is transmitted and received between the first and second processors in a state associated with data related to the object.

3. The transfer system according to claim 1,
wherein the operation terminal includes the interface configured to, if detection is not performed correctly in the second imaging and detection system, change the imaging and detection system data such that detection is performed correctly in the second imaging and detection system.

4. The transfer system according to claim 1,
wherein the imaging and detection system data includes at least one of the first image, the second image, an imaging and detection program, an imaging and detection parameter, an intensity of lighting used in the first imaging and detection system and the second imaging and detection system, and a color of the lighting.

5. The transfer system according to claim 1,
wherein the second image is an image of a tray on which the object is not set, and the first processor for the first imaging and detection system detects the object by use of an image obtained by subtracting the second image from the first image.

\* \* \* \* \*